US007908181B2

(12) United States Patent
Dotson

(10) Patent No.: US 7,908,181 B2
(45) Date of Patent: Mar. 15, 2011

(54) METHOD FOR CUSTOMIZING A NUTRITION PLATE

(76) Inventor: Kristy Dotson, Lombard, IL (US)

( * ) Notice: Subject to any disclaimer, the term of this patent is extended or adjusted under 35 U.S.C. 154(b) by 21 days.

(21) Appl. No.: 12/461,821

(22) Filed: Aug. 25, 2009

(65) Prior Publication Data

US 2010/0198699 A1  Aug. 5, 2010

Related U.S. Application Data

(60) Provisional application No. 61/202,165, filed on Feb. 3, 2009.

(51) Int. Cl.
*G06Q 30/00* (2006.01)
(52) U.S. Cl. ........................ 705/26.5; 220/575
(58) Field of Classification Search .............. 705/26, 705/27; 220/575
See application file for complete search history.

(56) References Cited

U.S. PATENT DOCUMENTS

| 4,464,122 | A | * | 8/1984 | Fuller et al. ............... 434/262 |
| 4,966,295 | A | | 10/1990 | Parrish |
| 5,007,743 | A | * | 4/1991 | Brennan .................... 374/141 |
| 5,560,653 | A | * | 10/1996 | Beppu ....................... 283/117 |
| 6,083,006 | A | * | 7/2000 | Coffman .................... 434/127 |
| 6,296,488 | B1 | * | 10/2001 | Brenkus et al. ............. 434/127 |
| 7,044,739 | B2 | * | 5/2006 | Matson ...................... 434/127 |
| 7,201,579 | B1 | | 4/2007 | Boyum |
| 2002/0015760 | A1 | | 2/2002 | Prosise et al. |
| 2003/0091687 | A1 | | 5/2003 | Copelan |
| 2004/0258823 | A1 | | 12/2004 | Dufresne et al. |
| 2005/0113649 | A1 | * | 5/2005 | Bergantino ................. 600/300 |
| 2006/0029695 | A1 | | 2/2006 | Kaczor |
| 2006/0029698 | A1 | | 2/2006 | Watson et al. |
| 2006/0199155 | A1 | * | 9/2006 | Mosher ..................... 434/127 |
| 2006/0263750 | A1 | | 11/2006 | Gordon |
| 2007/0289973 | A1 | | 12/2007 | Acosta et al. |

FOREIGN PATENT DOCUMENTS

GB  2 119 633 A  11/1983
WO  WO 01/16921 A1  3/2001

OTHER PUBLICATIONS http://web.archive.org/web/20070115095644/www.thedietplate.com/products.php?cat=1.*

* cited by examiner

*Primary Examiner* — Yogesh C Garg
*Assistant Examiner* — Matthew Zimmerman
(74) *Attorney, Agent, or Firm* — Richard C. Litman

(57) ABSTRACT

The nutrition system provides a customized nutritional and dietary plan for a user, based upon a calculated nutritional and metabolic profile of the user. The nutrition system includes a nutritional website and an online nutrition questionnaire. A nutritional and metabolic profile of the user is calculated based upon responses to the questionnaire. The user is further provided with a plurality of plate designs to select from. Once the user's plate design has been selected and the user's nutritional and metabolic profile has been calculated, a kit including the plate is formed and provided to the user. The plate has indicia formed thereon including a selected one of the plurality of plate designs and, further, including a plurality of demarcated regions. Each region represents a distinct nutritional food group, where dimensions of each region are dependent upon the calculated nutritional and metabolic profile of the user.

1 Claim, 12 Drawing Sheets

How to Determine Your Nutritional Profile

Directions: For each row, read each description (left to right).
Check the single box corresponding to the description that describes you the majority of the time.
If no choice applies to you, leave that row unchecked.
When finished, total each column. The column with the highest total determines your profile.

210

| CATEGORY | 212 | COLUMN 1  220 | COLUMN 2  230 |
|---|---|---|---|
| Body Shape: | 1 | Have a short, wide build (pear or apple-shaped) | Have an average height and build |
| Weight Gain: | 2 | Gain weight around the waist, hips, or thighs | Slight weight gain with even distribution |
| | 3 | Overweight and often struggles with weight loss | Maintain an average weight |
| | 4 | Bread and pasta cause weight gain | No particular foods cause weight gain |
| Energy Level: | 5 | Often tired or lethargic | Have average energy |
| | 6 | Often tired in the middle of the afternoon (1-5 p.m.) | Don't feel tired until the late evening (bedtime) |
| | 7 | Have below-average stamina/endurance | Have average endurance or stamina |
| | 8 | Do well on coffee and often rely on it for energy | Don't need coffee for energy. It doesn't make me jittery |
| Exercise: | 9 | Exercise is like work to me | Like to exercise, but is not mandatory |
| Appetite: | 10 | Have an excessive appetite | Have an average appetite |
| | 11 | Need large heavy meal to feel full | |
| | 12 | Often hungry between meals | |

| | | COLUMN 3 232 240 | 242 |
|---|---|---|---|
| | Have a tall and slim build | | |
| | Difficulty gaining weight | | |
| | Lose weight easily | | |
| | Meat and fatty foods cause weight gain | | |
| | Have a high level of sustained energy | | |
| | Rarely tired (often stay up late working) | | |
| | Have excellent stamina and can keep going more than others | | |
| | Don't really need coffee; it also makes me jittery and shaky | | |
| | Love to exercise and lead an active lifestyle | | |
| | Have a low appetite | | |
| | Small meals are filling | | |
| | Seldom hungry between meals | | |

*Fig. 4B*

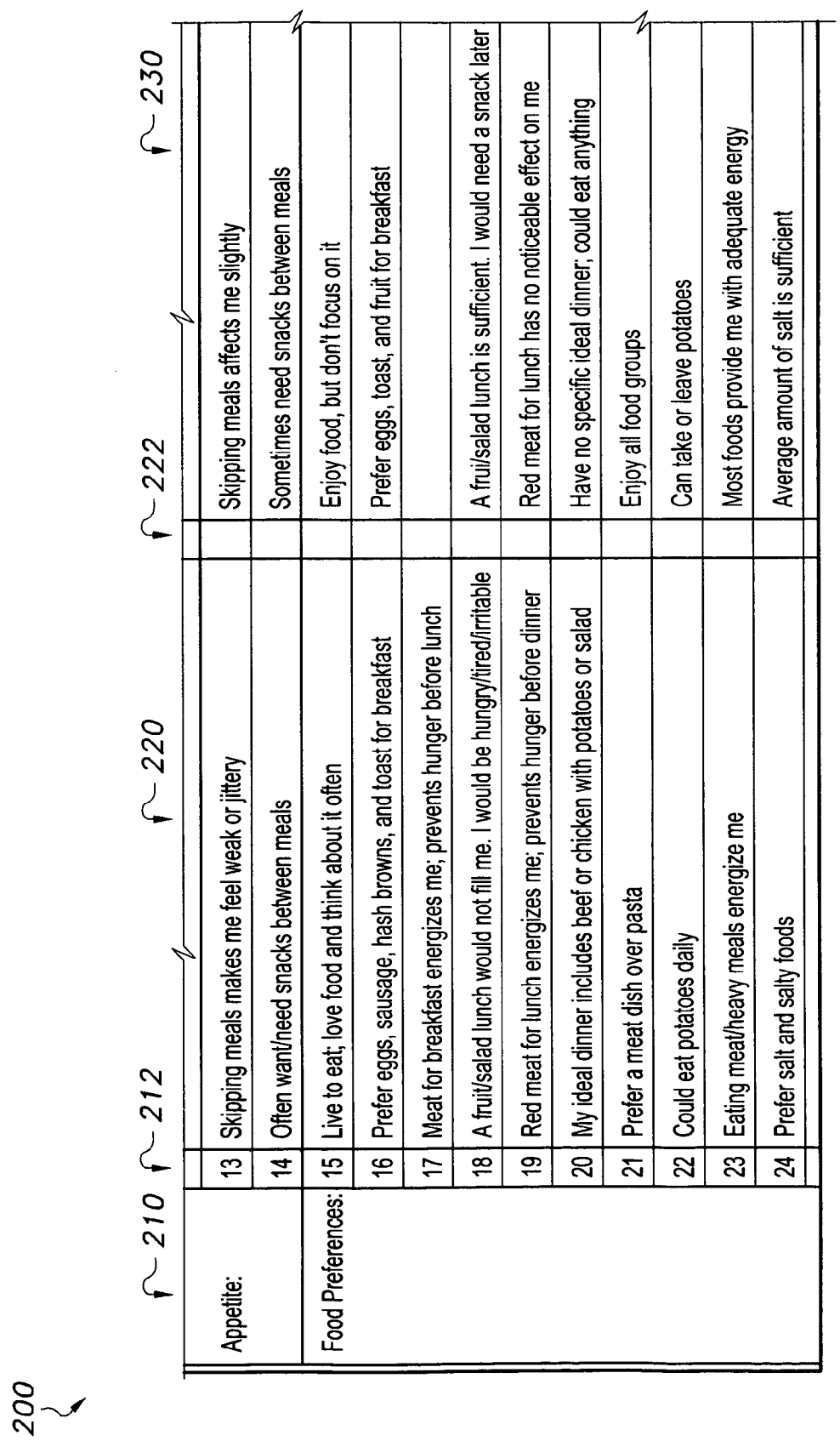

Fig. 4C

| | 210 | 212 | 220 | 222 | 230 |
|---|---|---|---|---|---|
| Appetite: | | 13 | Skipping meals makes me feel weak or jittery | | Skipping meals affects me slightly |
| | | 14 | Often want/need snacks between meals | | Sometimes need snacks between meals |
| Food Preferences: | | 15 | Live to eat; love food and think about it often | | Enjoy food, but don't focus on it |
| | | 16 | Prefer eggs, sausage, hash browns, and toast for breakfast | | Prefer eggs, toast, and fruit for breakfast |
| | | 17 | Meat for breakfast energizes me; prevents hunger before lunch | | |
| | | 18 | A fruit/salad lunch would not fill me. I would be hungry/tired/irritable | | A fruit/salad lunch is sufficient. I would need a snack later |
| | | 19 | Red meat for lunch energizes me; prevents hunger before dinner | | Red meat for lunch has no noticeable effect on me |
| | | 20 | My ideal dinner includes beef or chicken with potatoes or salad | | Have no specific ideal dinner; could eat anything |
| | | 21 | Prefer a meat dish over pasta | | Enjoy all food groups |
| | | 22 | Could eat potatoes daily | | Can take or leave potatoes |
| | | 23 | Eating meat/heavy meals energize me | | Most foods provide me with adequate energy |
| | | 24 | Prefer salt and salty foods | | Average amount of salt is sufficient |

200

| | | 232 | 240 | 242 |
|---|---|---|---|---|
| | | Can sometimes forget to eat and it does not affect me | | |
| | | Rarely need snacks between meals | | |
| | | Eat to live; rarely think about food; can forget to eat | | |
| | | Prefer pastries, fruit/yogurt or cereal for breakfast | | |
| | | Meat for breakfast makes me feel sleepy and lethargic | | |
| | | A fruit/salad lunch completely satisfies me | | |
| | | Red meat for lunch makes me feel sleepy and lethargic | | |
| | | My ideal dinner is light with some fish and plenty of vegetables | | |
| | | Prefer pasta over a meat dish | | |
| | | Don't care for potatoes that much | | |
| | | Eating meat makes me tired. Light meals energize me | | |
| | | Prefer little or no salt | | |

*Fig. 4D*

How to Determine Your Nutritional Profile

Directions: For each row, read each description (left to right).
Check the single box corresponding to the description that describes you the majority of the time.
If no choice applies to you, leave that row unchecked.
When finished, total each column. The column with the highest total determines your profile.

| CATEGORY 252 | | COLUMN 1 260 | COLUMN 2 262 | 270 |
|---|---|---|---|---|
| Food Preferences: | 25 | Crave Salty or fatty food (chips, cheese, meat) | Tend not to have any cravings | |
| Weight Gain: | 26 | Prefer a rich or salty snack following a meal | | |
| | 27 | Prefer rich desserts such as chocolate & cheesecake | Have no specific dessert preferences | |
| | 28 | Like sour food | Neither like nor dislike sour foods | |
| Digestion: | 29 | Good digestion, frequent eliminations (3 or more per day) | Average digestion and eliminations (1-3 per day) | |
| | 30 | Prone to diarrhea when stressed | Not prone to diarrhea or constipation | |
| | 31 | Digest meat with ease | Average digestion of meat | |
| | 32 | Eating raw vegetables causes gas/digestive problems | | |
| Personality: | 33 | Extremely patient; very easy-going; laid back; low stress | Average patience; cooperative; moderate stress | |
| | 34 | Very friendly and social; extrovert | In-between; somewhat extroverted and somewhat introverted | |
| | 35 | Easily depressed | Average spirit with some depression | |
| | 36 | Intuitive; very creative; right-brained | Average intellect; somewhat creative/somewhat analytical | |
| | 37 | Have decreased mental alertness in the afternoon; strong need for caffeine | Desire better organization and a little structure | |
| | 38 | Extremely disorganized; often procrastinates | Desire better organization and a little structure | |

*Fig. 5A*

METHOD FOR CUSTOMIZING A NUTRITION PLATE

CROSS-REFERENCE TO RELATED APPLICATION

This application claims the benefit of U.S. Provisional Patent Application Ser. No. 61/202,165, filed Feb. 3, 2009.

BACKGROUND OF THE INVENTION

1. Field of the Invention

The present invention relates to diet and nutrition, and particularly to a nutrition system that includes a web-based metabolic profile questionnaire to determine a person's metabolic profile and furnishes a kit containing a plate designed to implement a diet corresponding to the person's metabolic profile, along with instructional media explaining the diet and use of the plate to implement the diet.

2. Description of the Related Art

One of the most prevalent health problems in the Western World, particularly in the United States, is that of excessive body weight. Being overweight is epidemic, with more than 50% of the adult population of the U.S. suffering therefrom. Accordingly, developing and maintaining a physically fit and healthy body is becoming the goal of an increasing number of individuals. As of late, the public has become increasingly aware of the importance of a proper diet for weight control, as well as for health maintenance and disease prevention. As a result, many diets have been designed to lose weight, to maintain present weight, or to assure the consumption of appropriate nutrition.

A large segment of the population is on a special diet at any given time. According to the American Obesity Association, it is estimated that 40% of the women and 25% of the men of the United States are on a special diet for the purpose of weight control. Unfortunately, most dieters fail to achieve their goals for a number of reasons. First, many diets have numerous different and often conflicting guidelines that are presented in a complex manner, thus making it difficult for a person to understand and carry out the diet correctly. A second reason is the often sparse, rigid or monotonous nature of the nutritional regimen prescribed. Self-deprivation is not a well-developed trait in modern society, and quite a few diets rely purely on caloric restriction.

A third reason is that most diets do not address the need for the dieter to understand the underlying principles of the diet so that he or she can effectively maintain personally appropriate eating habits after the diet period has ended. The most important aspect of all weight control diets is the need to limit calories. With very few exceptions (such as, for example, serious illnesses), the only way by which a person loses weight is by consuming fewer calories than are required by the body metabolism to support the required energy level. When fewer calories are consumed, the body metabolizes stored body fat, resulting in weight loss. Conversely, when too many calories are consumed, the body stores this excess energy source as body fat, resulting in weight gain. Simply restricting calories without a developed plan, however, can be dangerous to the dieter, in that the dieter may also restrict essential nutrients.

It is, of course, important to obtain the aforementioned calories from foods that provide proper nutrition to the body. The body has a broad range of nutritional needs in order to maintain health and full function. Accordingly, a person who simply counts calories will not achieve the goal of developing and maintaining a physically fit and healthy body, since being concerned with calories to the exclusion of all other factors will not provide proper nutrition. It is well known that a balanced diet includes food from several food groups in order to provide optimum levels of nutrients, such as protein, carbohydrates, fats, fiber, vitamins and minerals.

Many meal planning aids have been proposed to assist dieters to consume a diet with proper macro- and micronutrient balance. Various techniques have been implemented to control calories and also instruct the user in using a wide variety of food groups in their meals. Such systems and methods include nutritional charts, tickets, vouchers and containers, each labeled according to lists of foods and categories of foods.

Although considerable effort has been directed towards dietary meal plans, the results have not been totally satisfactory due to the need for ongoing record keeping and oversight, and in most cases the procedures involved are cumbersome, time consuming, and inconvenient to implement. Another well-known diet management system, known generally as an "exchange diet", divides food into six groups or "exchanges". According to such exchange diets, food groups are referred to as exchanges, such as bread exchanges, meat exchanges, fat exchanges, fruit exchanges, milk exchanges, and vegetable exchanges. The "exchange" is a unit of food, which may be different for each food group. However, within a particular food group, each exchange is approximately equal in calories and in the amount of certain nutrients such as carbohydrates, proteins, fats, fiber minerals and vitamins. For each food group, an "exchange list" is provided which sets forth the amount of a specific food that constitutes an exchange. For example, a small apple and one-fourth of a cantaloupe melon constitute one fruit exchange.

The exchange diet further specifies the number of exchanges for each food group for a specified daily caloric intake. For example, for a daily two thousand calorie intake, a person is allowed nine bread exchanges, nine meat exchanges, four fat exchanges, six fruit exchanges, three milk exchanges, and two vegetable exchanges. As is readily apparent, exchange diets require time and careful attention to carry out properly. A person observing an exchange diet must determine the number of exchanges allowed for each food group, keep track of the number of exchanges consumed in each food group, and keep track of the number of exchanges remaining in each food group. Such information is typically processed and maintained by memory, by notes, or by predetermined menus. Such procedures are both time-consuming and prone to error.

Various calculators, notepads, records and the like have been used to aid in such memory and calculation-intensive diet plans, but such devices and systems also rely heavily on the user to keep careful notes and records, thus also making such systems prone to user error. Further, while these systems provide for orderly and systematic monitoring of exchange limits and exchanges consumed, they are typically awkward and cumbersome to use on a daily basis.

A further well-known method of managing a diet consists of pre-prepared and pre-packaged dietetic food. Typical supermarket shelves and freezers are well stocked with such foods. Such dietetic food is often pre-packaged into meals that provide well-balanced nutrition with limited calories. However, they do not provide any guidance to the dieter for building or adhering to a structured diet. Moreover, nothing prevents a hungry dieter from eating a plurality of such meals each day or in a single sitting.

Further, the problem of planning and maintaining a healthful diet goes beyond weight control concerns and exists with respect to other special diets, such as those associated with diet-responsive health conditions like cardiovascular disease, diabetes, hypercholesterolemia, hyperglycemia, osteoporosis, cancer and many others, and those required for individuals with special sensitivities or allergies or individuals requiring a special diet, such as athletes. There are some advantages to such systems, as the variety of foods within the pre-packaged meals enhances ongoing compliance with the diet, and there is very little preparation or cooking to be performed. However, such meals and such systems that utilize such meals have a number of disadvantages, such as denying the dieter the option of selecting the components of each meal, not providing the dieter with the tools nor the knowledge to understand what he or she is consuming, not facilitating the dieter's ability to carry on healthy eating habits after ending the diet, and not providing any means for monitoring or oversight of compliance. Thus, a nutritional method and plate for use therewith solving the aforementioned problems is desired.

SUMMARY OF THE INVENTION

The nutritional system provides a customized nutritional and dietary plan for a user, based upon a calculated nutritional and metabolic profile of the user. The nutritional method includes the steps of first establishing a nutritional website accessible by the user via the Internet (or any other suitable wide-area or local computer network), and providing an online nutritional questionnaire to the user. A nutritional and metabolic profile of the user is calculated based upon responses to the online nutritional questionnaire.

The user is further provided with a plurality of plate designs to select from. Once the user's plate design has been selected and the user's nutritional and metabolic profile has been calculated, a kit including the plate is formed and provided to the user. The plate includes a main plate body having opposed upper and lower surfaces. The plate has indicia formed on the upper surface thereof, with the indicia including a selected one of the plurality of plate designs and, further, including a plurality of demarcated color-coded regions. Each region represents a distinct nutritional food group, where dimensions of each region depend upon the calculated nutritional and metabolic profile of the user. The kit also includes information and instructions, which may include multimedia material, for using the plate to follow a diet that corresponds to the user's nutritional and metabolic profile.

These and other features of the present invention will become readily apparent upon further review of the following specification and drawings.

BRIEF DESCRIPTION OF THE DRAWINGS

FIGS. 4A, 4B, 4C and 4D together illustrate a screen shot of a questionnaire page used in a nutrition system according to the present invention.

FIGS. 5A, 5B, 5C and 5D together illustrate a screen shot of a second page of the questionnaire of FIGS. 4A, 4B, 4C and 4D.

Similar reference characters denote corresponding features consistently throughout the attached drawings.

DETAILED DESCRIPTION OF THE PREFERRED EMBODIMENTS

Figure 1:
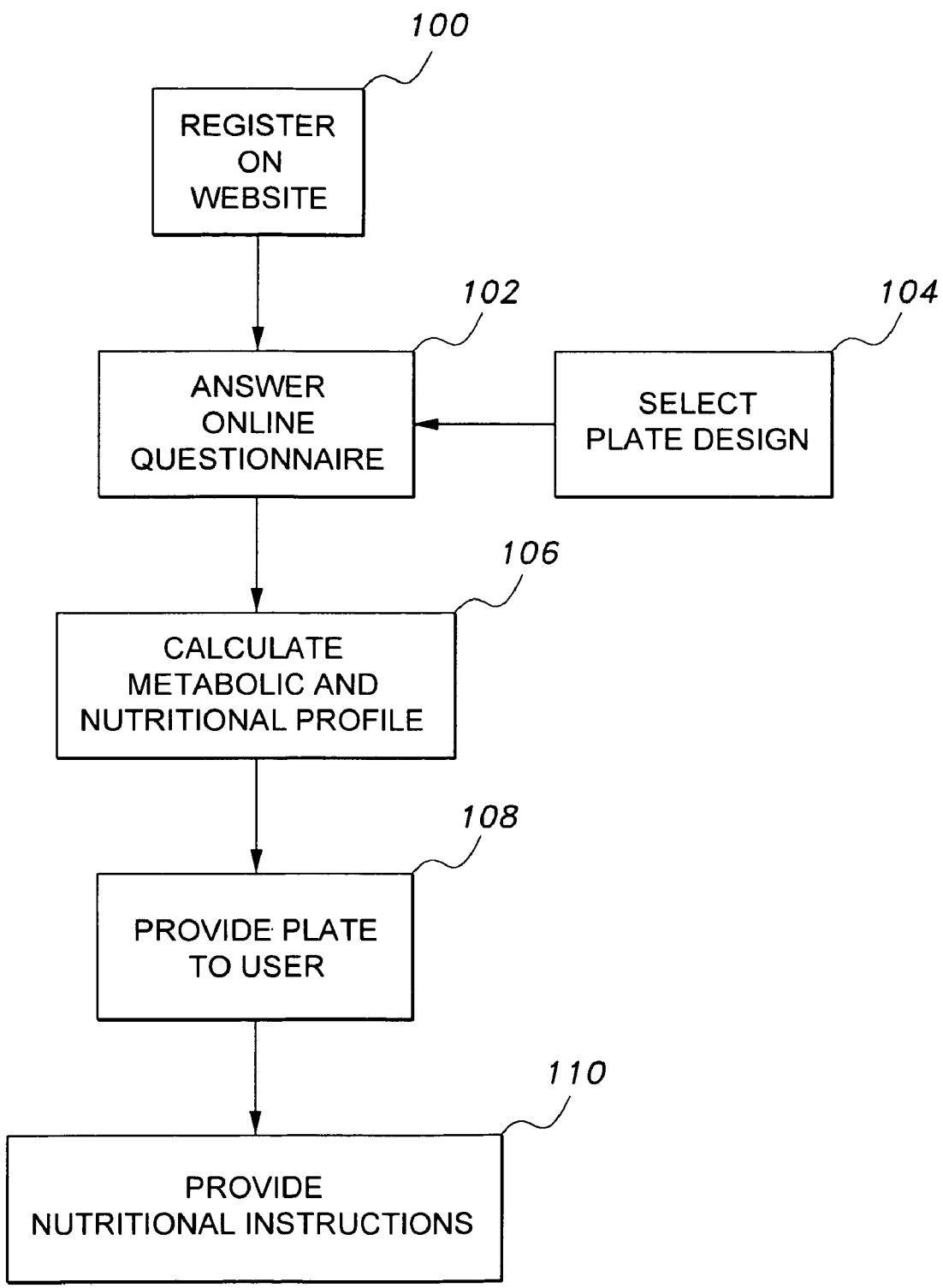
FIG. 1 is flowchart illustrating the steps of a method implementing a nutrition system according to the present invention.

The nutritional system provides a customized nutritional and dietary plan for a user, based upon a calculated nutritional and metabolic profile of the user. The nutritional system includes a nutrition website accessible by the user via the Internet (or any other suitable wide-area or local computer network), the user registering on the website (step 100 in FIG. 1). Once registered, the user is provided with an online nutrition questionnaire (step 102). A nutritional and metabolic profile of the user is then calculated (step 106) by software based upon responses to the online nutrition questionnaire. The associated software for displaying the website to the user through the network may be stored on any suitable type of network server, as is well known in the art, including at least a processor in communication with computer readable memory, and coupled with a suitable network interface.

Figure 5B:
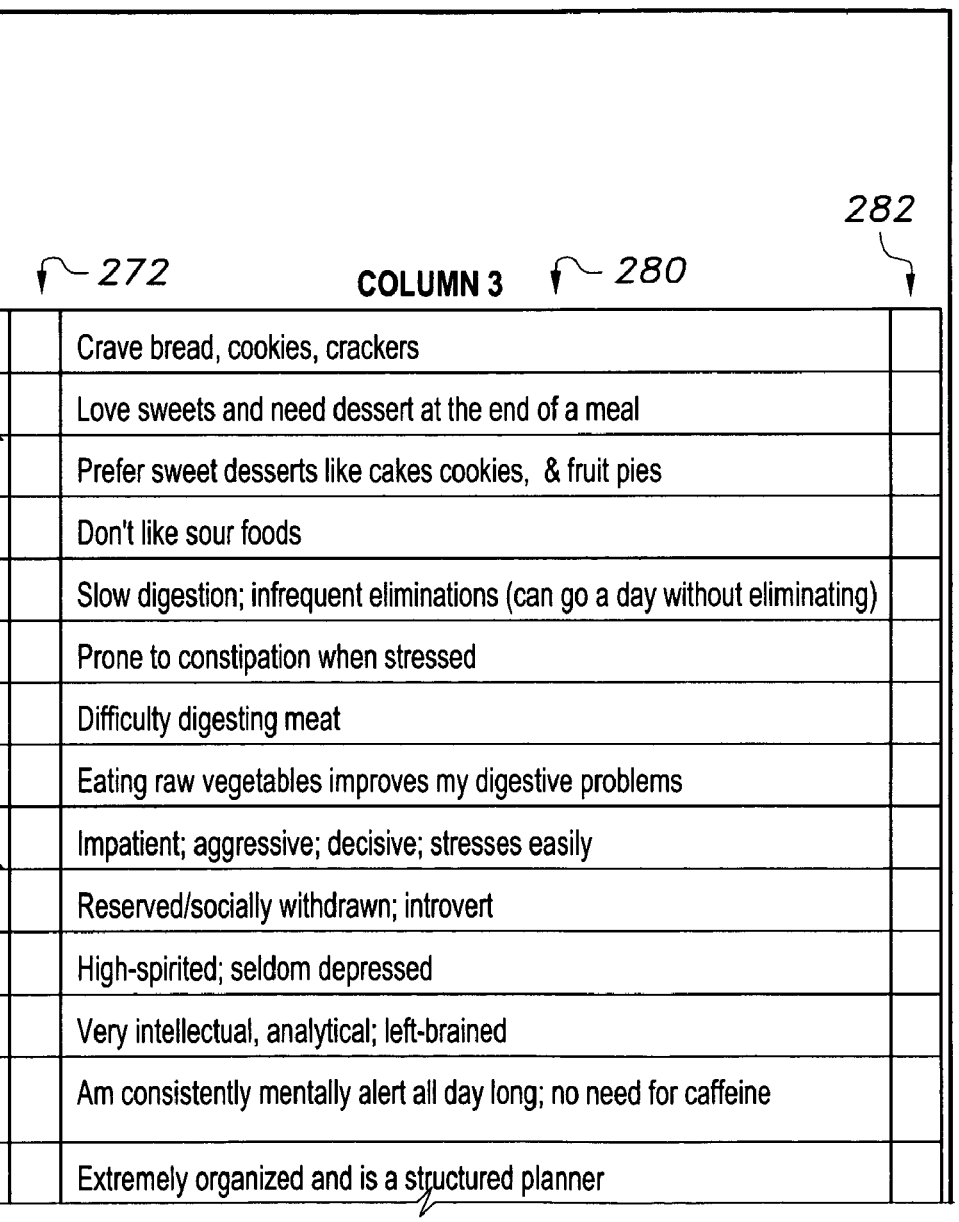
Figure 5C:
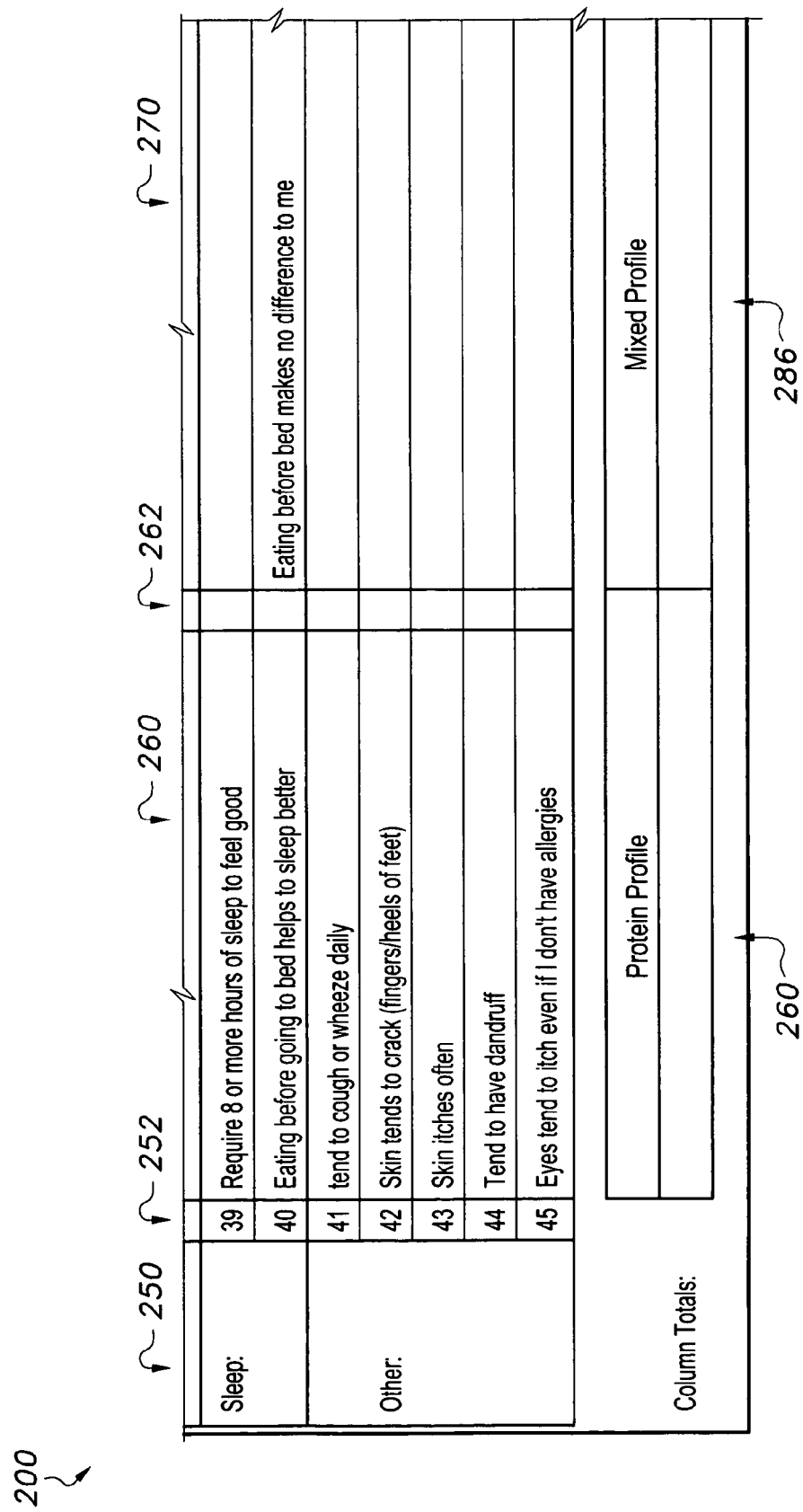
Figure 5D:
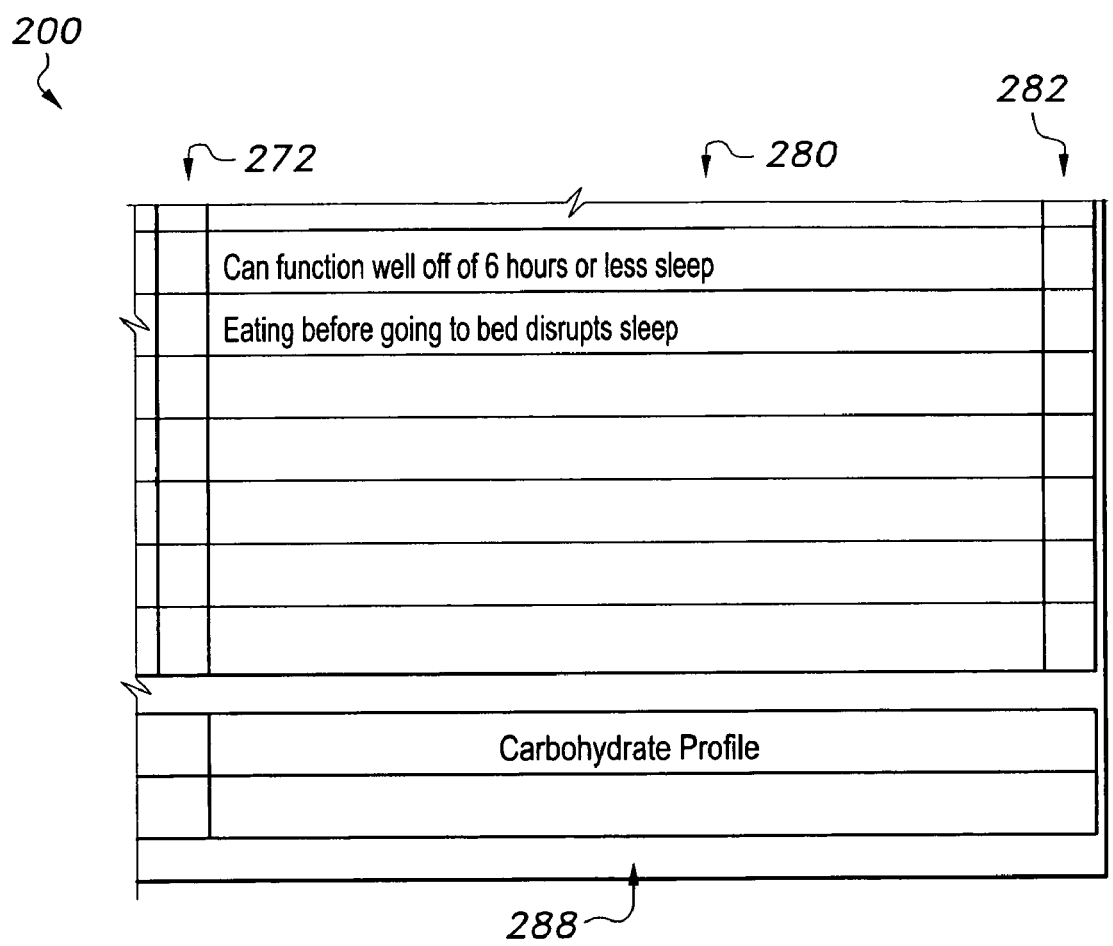

FIGS. 4A-4D and 5A-5D illustrate exemplary screen-shots of an exemplary questionnaire 200 that may be provided to the user on the website. It should be understood that FIGS. 4A, 4B, 4C and 4D represent a single page shown to the user. This single page has been broken into four separate Figures for purposes of clarity and legibility. When shown on a screen to the user, the columns of FIG. 4B are positioned to the right of FIG. 4A, FIG. 4C is positioned directly beneath FIG. 4A, and FIG. 4D is positioned to the right of FIG. 4C (and beneath FIG. 4B). Similarly, the columns of FIG. 5B are positioned to the right of FIG. 5A, FIG. 5C is positioned directly beneath FIG. 5A, and FIG. 5D is positioned to the right of FIG. 5C (and beneath FIG. 5B). FIGS. 4A-4D represent a first page provided to the user, and FIGS. 5A-5D represent a continuing, or second, page of the questionnaire 200. As shown, the questionnaire 200 is divided into categories 210, 250, such as, but not limited to, body shape, weight gain, energy level, exercise, appetite, food preference, digestion, personality, sleep, and a miscellaneous or "other" category.

For each category, three exemplary columns (columns 220, 230, 240 in FIGS. 4A-4D; and columns 260, 270, 280 in FIGS. 5A-5D) are provided. The user then marks, in a checkbox to the right of each column, which description best applies to him or her. In FIGS. 4A-4D, checkbox 222 corresponds to column 220, checkbox 232 corresponds to column 230, and checkbox 242 corresponds to column 240. Similarly, in FIGS. 5A-5D, checkbox 262 corresponds to column 260, checkbox 272 corresponds to column 270, and checkbox 282 corresponds to column 280.

It should be understood that the descriptions given for each category are shown for exemplary purposes only, and may be varied, replaced, removed or added to without departing from the spirit or scope of the present invention. In use, the user marks one checkbox for each row or may choose to leave one or more rows blank. The number of checkmarks in each of columns 222, 232, 242, 262, 272 and 282 are then totaled, with the respective column totals being inserted in profile boxes 284, 286, 288.

Table 1, given below, illustrates an example result, giving the selected choice for each row number 212, 252, and showing which column would be checked (or left blank) for each row numbered question.

TABLE I

| Question Number | Selected Answer | Column Checked |
|---|---|---|
| 1 | Have an average height and build | 232 |
| 2 | Gain weight around the waist, hips or thighs | 222 |
| 3 | Maintain an average weight | 232 |
| 4 | Breads and pasta cause weight gain | 222 |
| 5 | Have average energy | 232 |
| 6 | Often tired in the middle of the afternoon (1-5 pm) | 222 |
| 7 | Have excellent stamina and can keep going more than others | 242 |
| 8 | Do well on coffee and often rely on it for energy | 222 |
| 9 | Love to exercise and lead an active lifestyle | 242 |
| 10 | Have an excessive appetite | 222 |
| 11 | Need large, heavy meals to feel full | 222 |
| 12 | Often hungry between meals | 222 |
| 13 | Skipping meals makes me feel weak or jittery | 222 |
| 14 | Rarely need snacks between meals | 242 |
| 15 | Enjoy food, but don't focus on it | 232 |
| 16 | Prefer pastries, fruit/yogurt or cereal for breakfast | 242 |
| 17 | Meat for breakfast makes me feel sleepy and lethargic | 242 |
| 18 | A fruit/salad lunch is sufficient; I would need a snack later | 232 |
| 19 | Red meat for lunch makes me feel sleepy and lethargic | 242 |
| 20 | Have no specific ideal dinner; could eat anything | 232 |
| 21 | Enjoy all food groups | 232 |
| 22 | Don't care for potatoes that much | 242 |
| 23 | Eating meat makes me tired; light meals energize me | 242 |
| 24 | Average amount of salt is sufficient | 232 |
| 25 | Crave bread, cookies, crackers | 282 |
| 26 | Love sweets and need dessert at the end of a meal | 282 |
| 27 | Prefer rich desserts such as chocolate & cheesecake | 262 |
| 28 | Don't like sour foods | 282 |
| 29 | Average digestion and eliminations (1-3 per day) | 272 |
| 30 | Not prone to diarrhea or constipation | 272 |
| 31 | Average digestion of meat | 272 |
| 32 | Left Blank | Blank |
| 33 | Impatient; aggressive; decisive; stresses easily | 282 |
| 34 | Reserved/socially withdrawn; introvert | 282 |
| 35 | Average spirit with some depression | 272 |
| 36 | Very intellectual, analytical; left-brained | 282 |
| 37 | Have decreased mental alertness in the afternoon; strong need for caffeine | 262 |
| 38 | Desire better organization and a little structure | 272 |
| 39 | Require 8 or more hours of sleep to feel good | 262 |
| 40 | Eating before going to bed disrupts sleep | 282 |
| 41 | Left Blank | Blank |
| 42 | Skin tends to crack (fingers/heels of feet) | 262 |
| 43 | Skin itches often | 262 |
| 44 | Left Blank | Left Blank |
| 45 | Eyes tend to itch even if I don't have allergies | 262 |

The totals of the above exemplary selections for the protein profile (box 284, calculated from the number of selected checkboxes in columns 222, 262) are 14; for the mixed profile (box 286, calculated from the number of selected checkboxes in columns 232, 272) are 13; and for the carbohydrate profile (box 288, calculated from the number of selected checkboxes in columns 242, 282) are 15.

The user has the highest total for the carbohydrate profile, and the user's nutritional and metabolic profile is calculated based upon the carbohydrate profile (in step 106). With the user's profile calculated, the user also chooses a particular plate design at step 104, including decorative indicia around the rim of the plate. At step 108, the plate is printed and provided to the user.

Figure 2A:
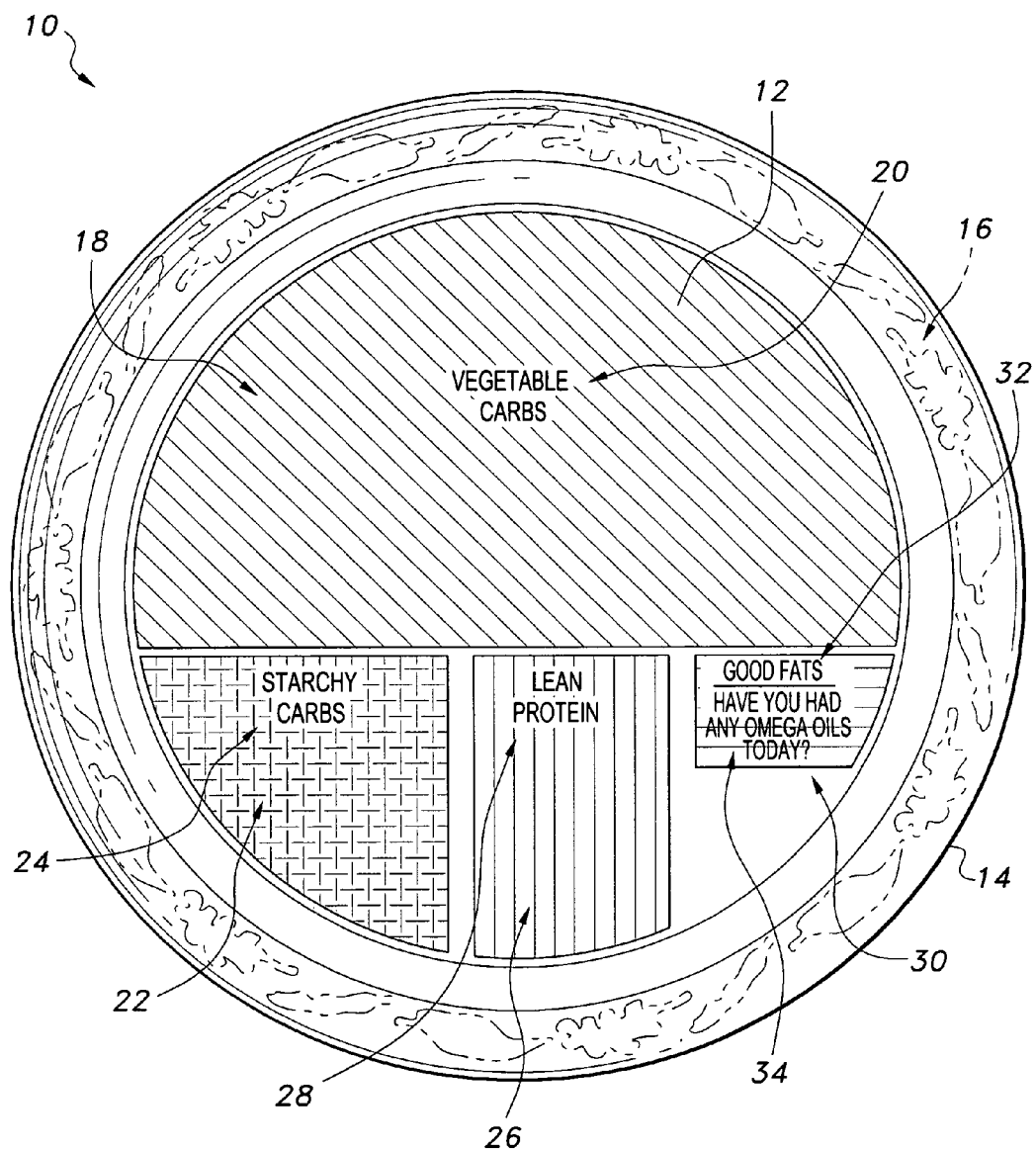
FIG. 2A is a plan view of an exemplary plate used in a nutrition system according to the present invention.
Figure 2B:
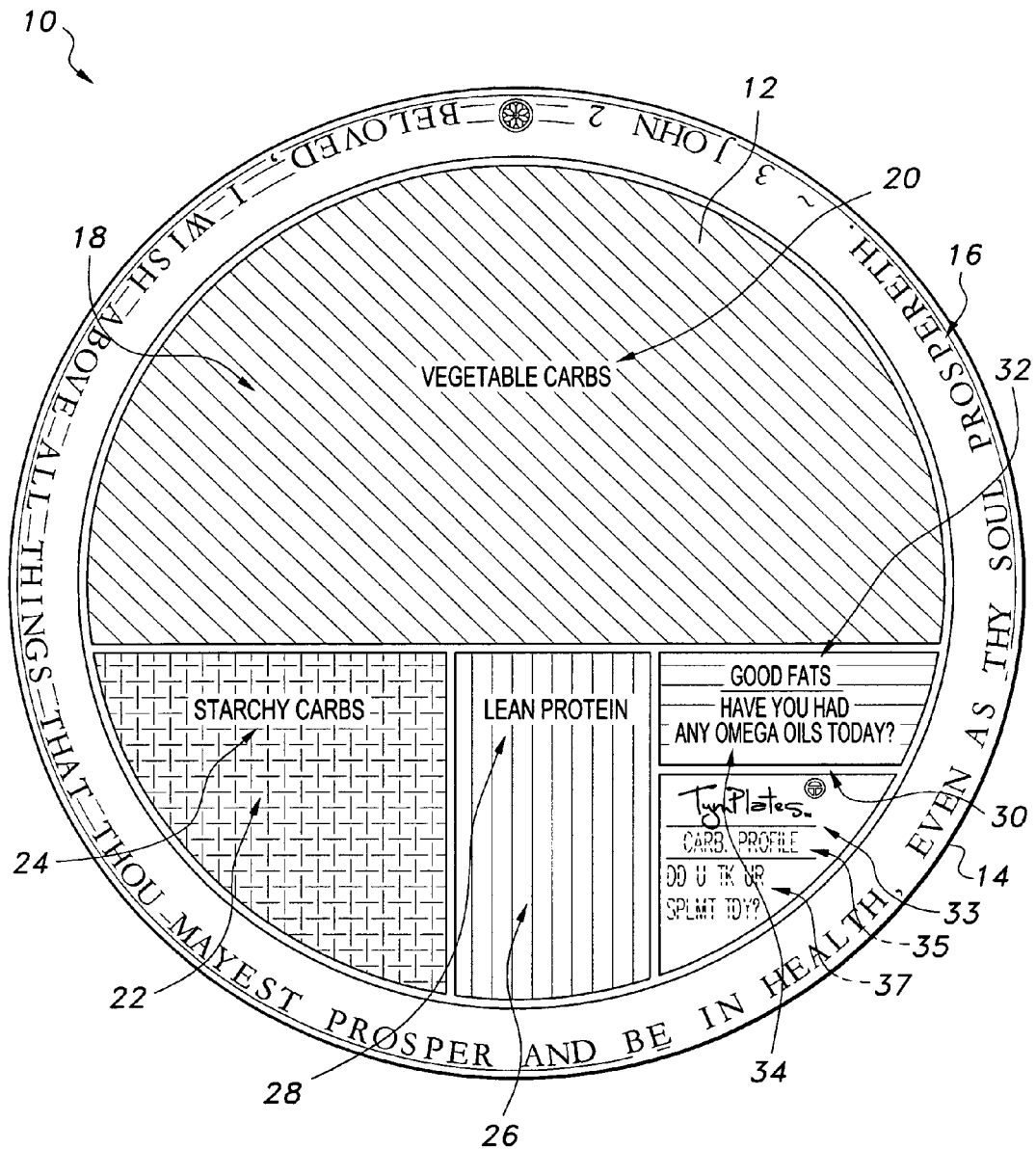
FIG. 2B is a plan view of an alternative exemplary plate used in a nutrition system according to the present invention.

An exemplary plate 10 is shown in FIG. 2A. Plate 10 is calculated based upon the calculated carbohydrate profile, given above. The plate 10 includes a main plate body, which is formed from any suitable material, such as melamine. The plate 10 has opposed upper and lower surfaces. The plate 10 has indicia formed on the upper surface 12 thereof. The design of the plate chosen by the user in step 104 is provided as indicia 16 formed about rim 14 of plate 10. It should be understood that the ornamental design shown in FIG. 2A is shown for exemplary purposes only. As an example of alternative indicia, the vegetable design of indicia 16 in FIG. 2A has been replaced by an inspirational message in plate 10 of FIG. 2B.

The indicia formed on upper surface 12 also divide the plate 10 into four separate regions. Region 18 represents carbohydrates provided by vegetables (as indicated by printed indicia label 20). Region 22 represents carbohydrates provided by starch (as indicated by printed indicia label 24). Region 26 represents lean protein (as indicated by printed indicia label 28). Region 30 represents "good" (i.e., healthy) fats (as indicated by printed indicia label 32). In addition to the individual labels, instructional or motivational messages, such as "Have you had any omega oils today?" (shown as indicia 34) may further be formed on the upper surface 12, in the appropriate region.

For the carbohydrate profile of plate 10, the volume of food to be eaten (represented by the surface area of each region) is divided into 20% for proteins, 5% for good fats, 55% for vegetable carbohydrates, and 20% for starchy carbohydrates. Preferably, each region is further provided with an individual color, thus providing visual indication to the user of how the food for a meal should be divided. For example, region 26 (i.e., protein) may be colored red; region 30 (i.e., good fats) may be colored blue; region 18 (i.e., vegetable carbohydrates) may be colored green; and region 22 (i.e., starchy carbohydrates) may be colored yellow.

It should be understood that the indicia of FIG. 2A are shown for exemplary purposes only. For example, in plate 10 of FIG. 2B, additional indicia have been added in the form of a user-selectable logo 33, a label 35 (in this example, the label notifies the user that this plate is specifically for the carbohydrate profile), and a further instructional or inspirational message 37, such as, for example, "Did you take your supplements today?"

In addition to providing the user with the plate 10 at step 108, the user is also provided with a set of instructions and information at step 110. For example, the user of plate 10 (specifically tailored to the carbohydrate profile) may be instructed that having small or reduced appetites is normal for the carbohydrate profile. It is best to eat small meals and snacks frequently throughout the day. The user may further be instructed, for example, to be careful not to go for many hours without eating. The user may also be given color-coded instructions, allowing the user to easily follow the instructions, such as, for example, for the red portion (i.e., protein), stop after eating a single portion. For the yellow portion (i.e., starchy carbohydrates), use caution and limit your intake. For the green portion (i.e., vegetable carbohydrates), feel free to go and eat these in abundance.

Figure 3:
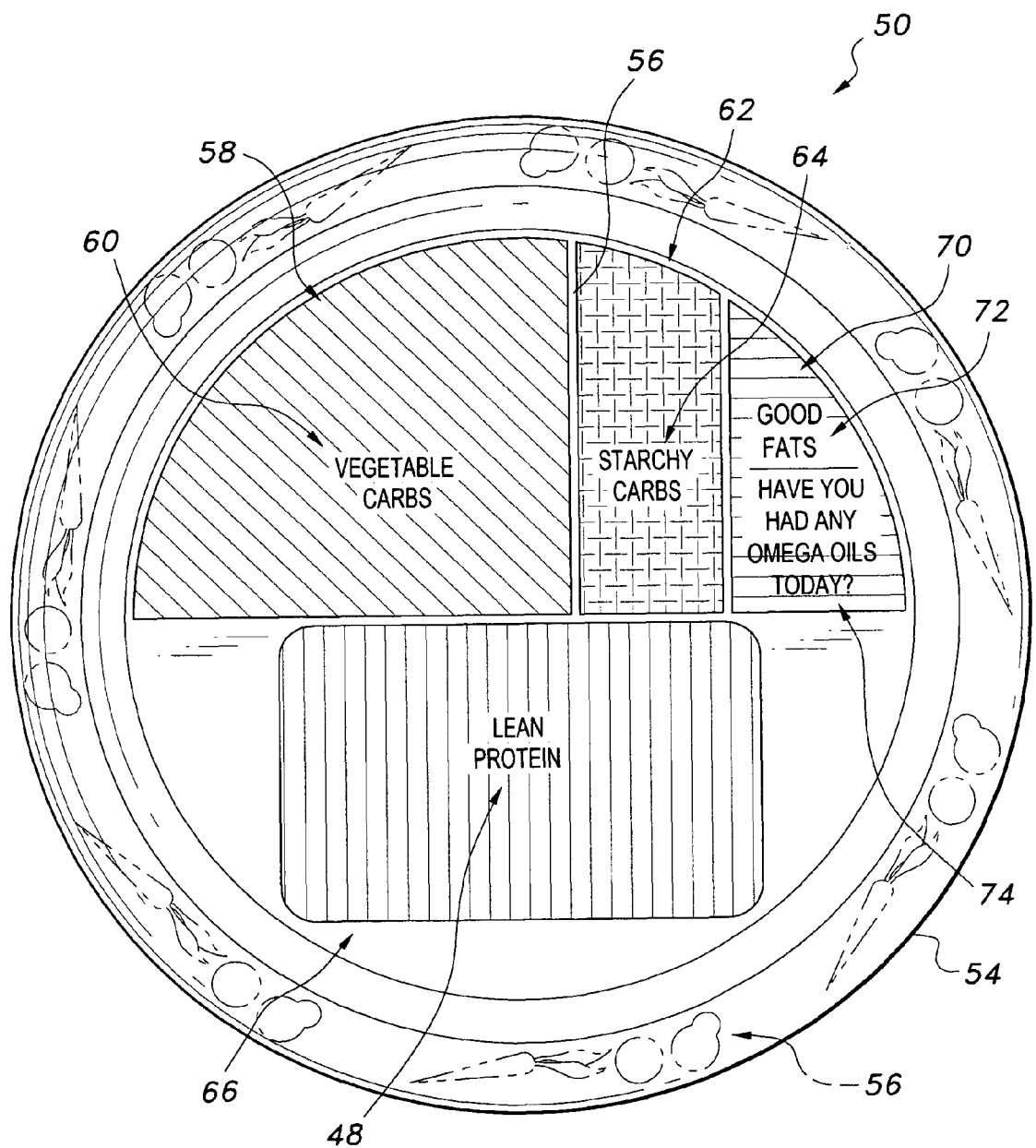
FIG. 3 is a plan view of another exemplary plate having an alternative configuration for use in the nutrition system according to the present invention.

FIG. 3 illustrates another exemplary plate 50. Plate 50 is calculated based upon the calculated protein profile, given above. The plate 50 includes a main plate body, similar to plate 10, having opposed upper and lower surfaces, as is conventionally known. The plate 50 similarly has indicia formed on the upper surface 56 thereof. The design of the plate chosen by the user in step 104 is provided as indicia 56 formed about rim 54 of plate 50 (shown as a different selection in FIG. 3 from that of plate 10 in FIG. 2A).

The indicia formed on upper surface 56 also divide the plate 50 into four separate regions. Region 58 represents carbohydrates provided by vegetables (as indicated by printed indicia label 60). Region 62 represents carbohydrates provided by starch (as indicated by printed indicia label 64). Region 66 represents lean protein (as indicated by printed indicia label 48). Region 70 represents "good" (i.e., healthy) fats (as indicated by printed indicia label 72). In addition to the individual labels, instructional or motivational messages, such as "Have you had any omega oils today?" (shown as indicia 74) may further be formed on the upper surface 56, in the appropriate region, as with plate 10.

For the protein profile of plate 50, the volume of food to be eaten (represented by the surface area of each region) is divided into 50% for proteins, 10% for good fats, 30% for vegetable carbohydrates, and 10% for starchy carbohydrates. Preferably, each region is similarly provided with an individual color, thus providing visual indication to the user of how the food for a meal should be divided. The instructions given above at step 110 may also be provided to the user for the protein profile, but tailored specifically for the protein profile, such as, for example, avoid over-eating by eating small amounts of food five to six times throughout the day.

A similar plate may be prepared for the mixed profile, having a protein region of 45%, a good fats region of 5%, a vegetable carbohydrates region of 38% and a starchy carbohydrates region of 12% (representing available surface area). Similar instructions may be provided to the user having the mixed profile.

In addition to the variations in region size, specialized plates, having smaller overall surface area or contouring may also be provided for specialized individuals having unique dietary needs, such as athletes or children, for example. Such a plate selection may be made in step 104, where the design of the plate is selected by the user, or may alternatively be made as part of the calculation step 106.

In the above, it should be understood that the method does not necessarily need to be implemented online; i.e., a paper copy of the questionnaire may be provided to the user, with answers being given in a conventional, rather than computerized, manner. In addition to the plate, the user may be provided with other items in the form of a kit. The kit may include, for example, a printed information guide, including nutritional information and instructions, as described above; the plate; separate printed instructions on the usage of the plate; a recipe book; and a set of video instructions and demonstrations recorded on a DVD or the like.

It is to be understood that the present invention is not limited to the embodiments described above, but encompasses any and all embodiments within the scope of the following claims.

I claim:

1. A computerized nutritional method, comprising the steps of:
   providing a nutritional questionnaire to a user on a website through a computer network, wherein the nutritional questionnaire includes questions from a plurality of categories selected from the group including body shape, weight gain, energy level, exercise, appetite, food preferences, digestion, personality, and sleep;
   receiving responses to the questions in the nutritional questionnaire through the computer network;
   calculating a nutritional and metabolic profile of the user in software based upon the user's responses to the nutritional questionnaire;
   providing the user with a plurality of user-selectable plate designs through the computer network;
   receiving a selection from the user of one of the plate designs through the computer network;
   receiving a purchase order from the user for a nutritional plate corresponding to the selected plate design and nutritional and metabolic profile, wherein the purchase order is received through the computer network;
   in response to receiving the purchase order, sending a kit to the user, the kit including a plate having indicia formed on an upper surface thereof corresponding to the user-selected plate design, the plate including a plurality of demarcated regions representing distinct nutritional food groups and having dimensions corresponding to the calculated nutritional and metabolic profile of the user.

\* \* \* \* \*